E. W. WOOLLEY.
AIR BRAKE AND APPURTENANCES FOR VEHICLES.
APPLICATION FILED FEB. 19, 1910.
1,050,414.
Patented Jan. 14, 1913.
3 SHEETS—SHEET 3.
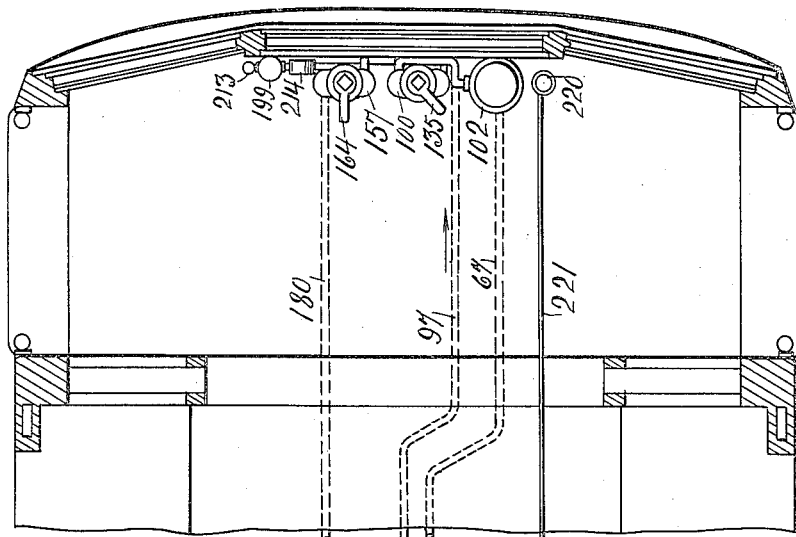
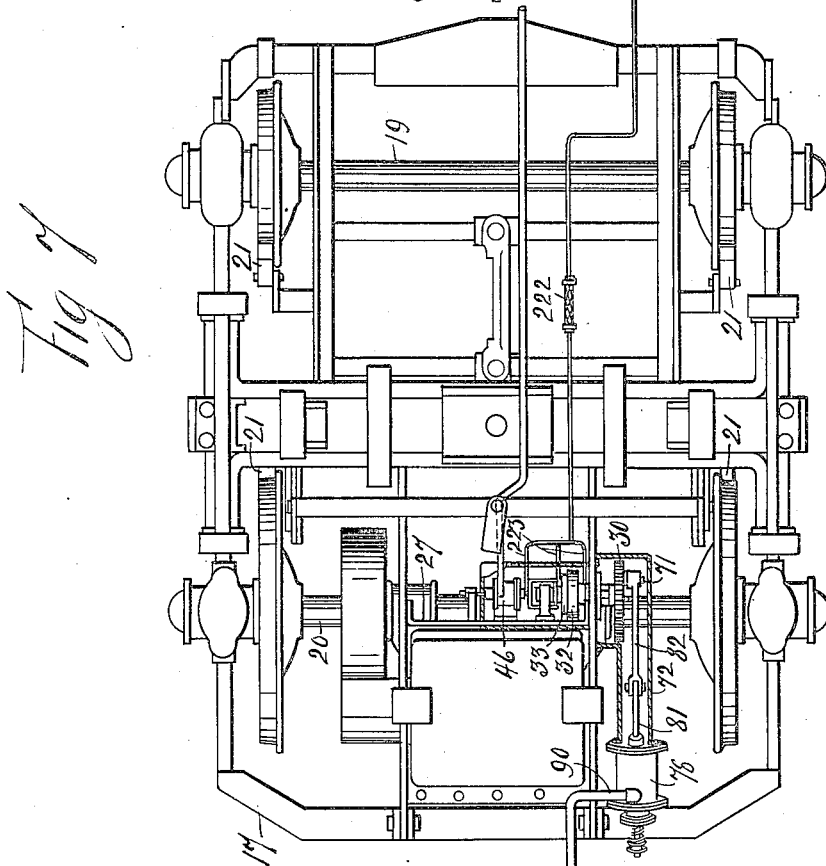
Fig. 7
Witnesses:
Martin Zimansky
John J. Miller
Inventor
Edward W. Woolley
By his Attorney
A. H. de Bonneville

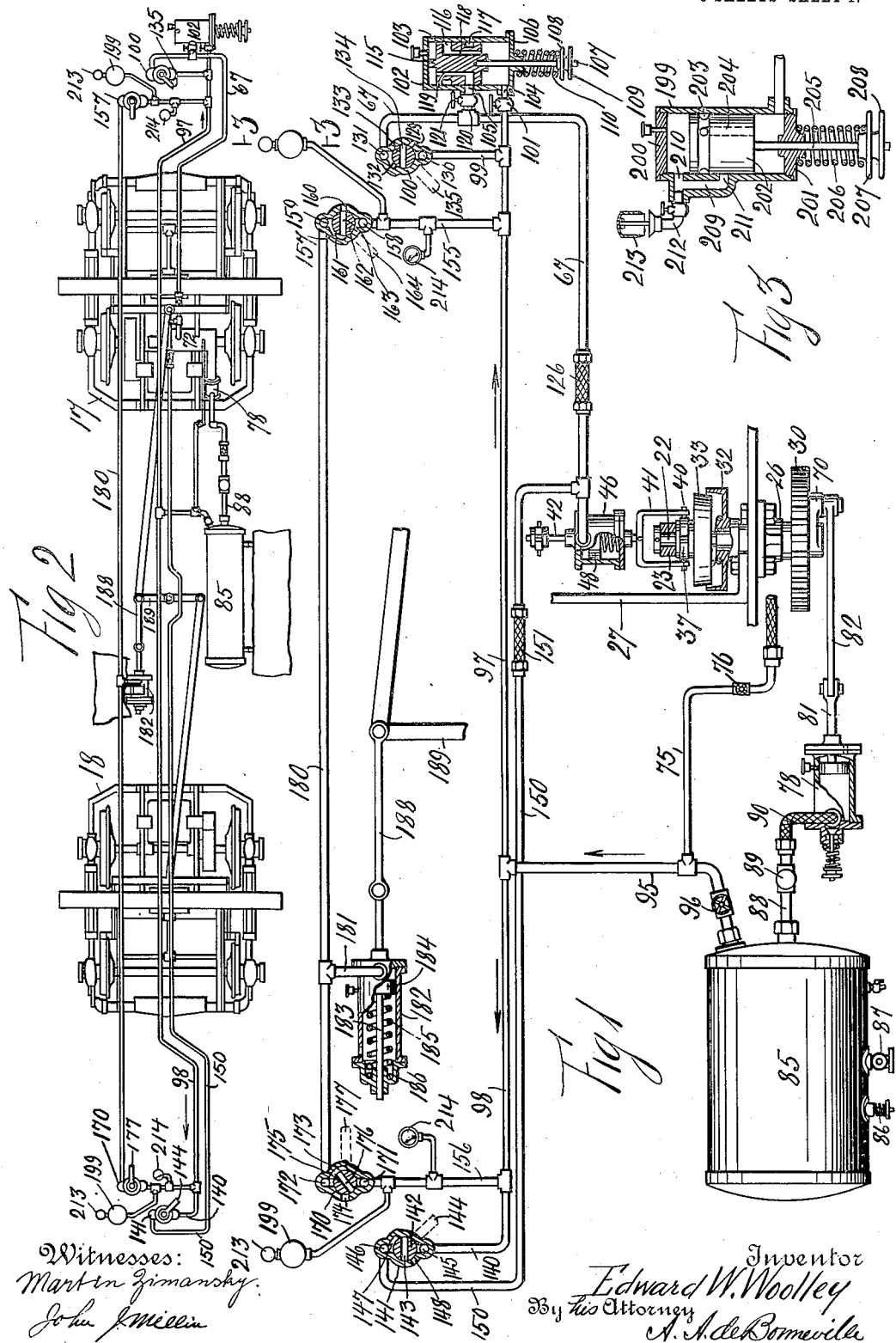
E. W. WOOLLEY.
AIR BRAKE AND APPURTENANCES FOR VEHICLES.
APPLICATION FILED FEB. 19, 1910.
1,050,414.
Patented Jan. 14, 1913.
3 SHEETS—SHEET 1.

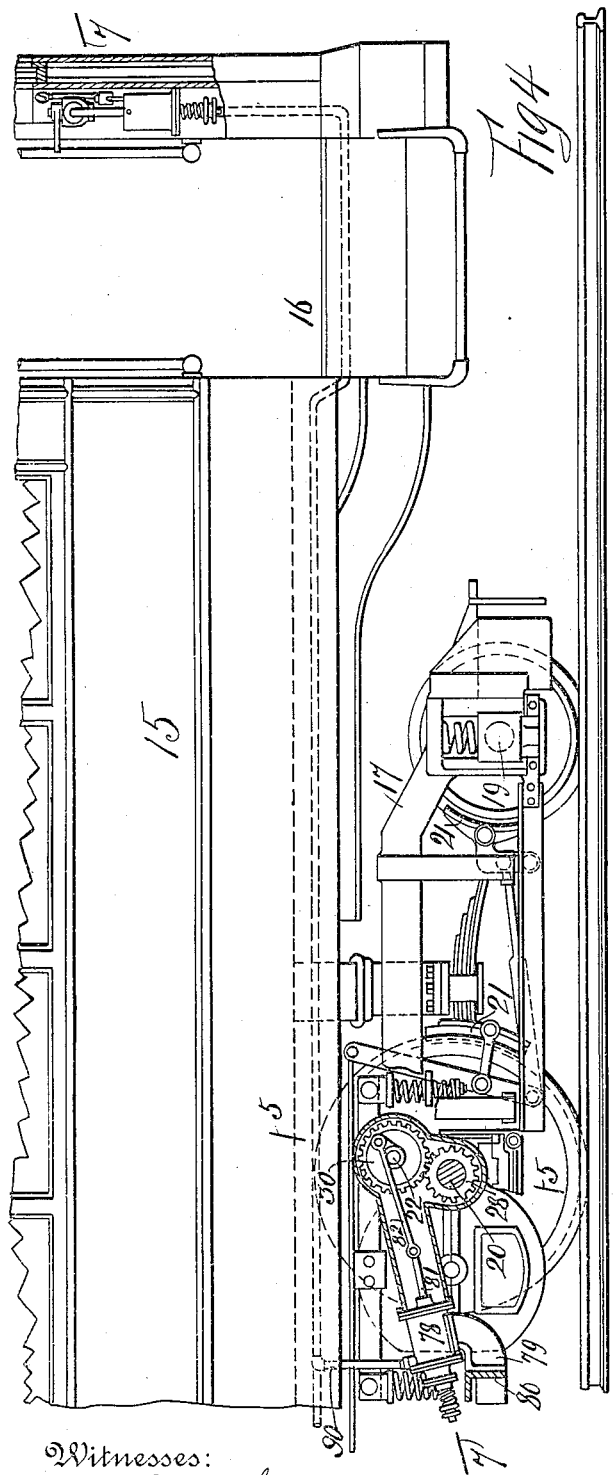
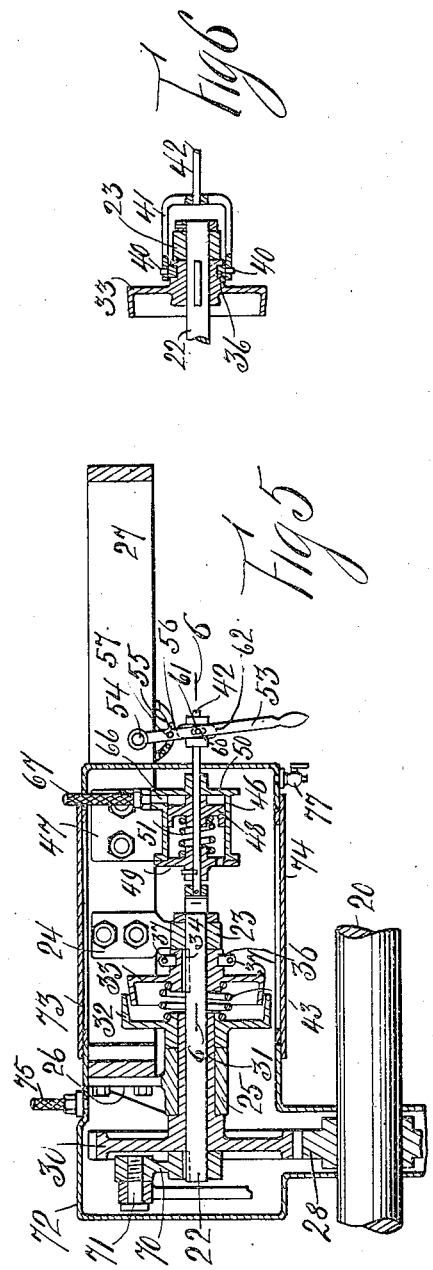

UNITED STATES PATENT OFFICE.

EDWARD W. WOOLLEY, OF JERSEY CITY, NEW JERSEY.

AIR-BRAKE AND APPURTENANCES FOR VEHICLES.

1,050,414.

Specification of Letters Patent.

Patented Jan. 14, 1913.

Application filed February 19, 1910. Serial No. 544,735.

*To all whom it may concern:*

Be it known that I, EDWARD W. WOOLLEY, a citizen of the United States, and a resident of Jersey City, in the county of Hudson and State of New Jersey, have invented certain new and useful Improvements in Air-Brakes and Appurtenances for Vehicles, of which the following is a specification.

This invention relates to improvements in air brakes and appurtenances for vehicles and is particularly adapted for operation with trolley cars.

The invention may be connected up with the air brake appurtenances usually installed upon such cars. Its organization comprises essentially a clutch shaft on which is journaled a sleeve, that has extending therefrom at one end a gear, and at the other end one of the members of a clutch. The said gear meshes with a second gear that is supported on the axle of the vehicle or trolley car, or said second gear may be connected up with any other convenient rotating element of the vehicle. On the clutch shaft is slidably supported the second member of the clutch, and a clutch cylinder actuates said second member. All of the immediate appurtenances of the clutch shaft are inclosed in a receptacle and forms a unit, for transmitting the rotations of the axle or other rotating element of the vehicle to the other appurtenances of the invention. It will be noted that to apply said unit to the vehicle all the parts thereof may be assembled ready for erection, and that with a split gear for the said axle or other rotative element on the car, the said unit may be easily put in place. A compressor is driven by the clutch shaft and conduits from the compressor connect with a pair of three-way cocks, one of the latter on each end of the vehicle. Conduits connect the three-way cocks with a brake cylinder, that is in turn connected with the brake mechanism of the vehicle. A reservoir for the compressor is connected by conduits to a second pair of three-way cocks to manually control the operations of a clutch cylinder and said conduits have connected up therewith a pressure regulating cylinder to automatically control the operations of the said clutch cylinder, and thereby control the pressure in the reservoir. A whistle with a signal cylinder and gage are connected with the conduits that lead from the reservoir.

Figure 1 represents a plan view partially in axial section of the essential elements of the invention, with the regulating cylinder thereof shown in a plane at right angles to the plane in which it is preferably used. Fig. 2 shows the top plan view of a pair of trucks of a trolley car with a fragmentary portion of the body thereof and the invention, Fig. 3 is an enlarged section of Fig. 1 on the line 3, 3, Fig. 4 represents a fragmentary elevation of a portion of a car with a portion of the invention attached thereto partly in section, Fig. 5 shows an enlarged section of Fig. 4 on the line 5, 5, Fig. 6 is a partial section of Fig. 5 on the line 6, 6, and Fig. 7 is a partial top plan view of the truck shown in Fig. 4 and a partial section of said Fig. 4 on the line 7, 7.

The invention is shown connected to a trolley car having the body 15 and end platforms 16. Trucks 17 and 18 with the axles 19 and 20 and brake shoes 21 support said body in the usual way. A split gear 28 is fastened to the axle 20.

A clutch shaft 22 for the truck 17 is journaled at one end in the journal brackets 23 having the flange 24 and at the other end in a sleeve, which in turn is journaled in the journal bracket 25 having the flange 26. The said flanges are bolted to the cross bar 27 of the truck 17. On the shaft 22 is journaled the spur gear 30 from the hub of which extends the sleeve 31 that is journaled in the journal bracket 25. On the sleeve 31 is securely supported one member 32 of a clutch, and an accompanying clutch member 33 is slidably carried on said shaft 22. A spline 34 is inserted between the shaft 22 and the clutch member 33. In the hub of the clutch member 33 is formed a groove for a ring 36, which latter is made in two parts in the usual way and clamped together by bolts 37. Pins 40 on the ring 36 support the fork 41 which is connected to the piston rod 42. A spring 43 encircles the clutch shaft 22 and bears between the members 32 and 33 of the clutch. A clutch cylinder 46 axially in line with the shaft 22 has extending therefrom the flange 47 by means of which it is bolted to the bar 27 of the truck 17. A piston 48 of the cylinder 46 is fastened to the piston rod 42 which latter preferably passes through both heads 49 and 50 of the clutch cylinder 46. A spring 51 encircles the piston rod 42 and bears between the head 49 and the piston 48. A forked lever 53 is fulcrumed on a pin 54 extending from the bar 27 while a segmental support 55 with openings 56 can adjust said lever 53 in different operative positions by means of a pin 57 engaging an opening in the lever 53 with one of the openings 56. The lever 53 has elongated openings 60 that engage pins 61 extending from a barrel 62 secured to the piston rod 42. A port 66 in the clutch cylinder 46 has extending therefrom the conduit 67. A crank 70 with the crank pin 71 is fastened to the clutch shaft 22 adjacent to the spur gear 30. A casing 72 having openings with the bonnets 73 and 74 incloses the clutch shaft 22 with its appurtenances to protect them from dust. The casing may be made of one or more parts bolted together to facilitate the introduction of the elements located therein and their inspection or detachment for repairs. A compressor 78 is supported on a bracket 79 extending from the cross brace 80 of the truck 17. The piston rod 81 of the compressor is connected to the crank 70 by means of the connecting rod 82. Instead of locating the clutch shaft 80 so as to be driven by means of the rotation of the axle 20 it can be located at the other end of the truck to coact with the axle 19. Piping 75 with the valve 76 connects the conduit 95 to be described with the casing 72, and a stop cock 77 is fitted to said casing. The piping 75 allows the blowing of compressed air through the casing 72 to clean the appurtenance therein.

A reservoir 85 is supported from the body 15 of the car and has connected thereto a safety valve 86, an independent inlet valve 87, inlet piping 88 with the check valve 89. The inlet piping 88 has also connected up therewith a piece of flexible tubing 90 and extends to the compressor 78. An outlet conduit 95 with the stop valve 96 extends from the reservoir 85 and has leading therefrom the longitudinal pipes 97 and 98 that extend to the ends of the car. The pipe 97 has connected thereto the branch piping 99 which leads to one end of a three-way cock 100. Beyond the piping 99 the pipe 97 is fitted with the valve 101 and connects with the lower end of the regulating cylinder designated generally by the numeral 102. The said regulating cylinder has the outlet opening 103 at its upper end, inlet port 104 at its lower end and a discharge port 105 at about its central portion. A bonnet 106 at the lower end of the cylinder 102 has passing through it the piston rod 107, that is threaded at its outer end for the adjusting nuts 108, 109. A spring 110 encircles the piston rod 107 and bears between the bonnet 106 and the adjusting nut 108. The piston rod 107 is connected to a piston 115 which has the circumferential port 116 at one end and the circumferential port 117 at the other end. A longitudinal port 118 connects with the port 116 and a longitudinal port 119 connects with the circumferential port 117. Piping 120 with the valve 121 connects the discharge port 105 with the piping 67 that has interposed therein a length of flexible tubing 126. The piping 67 also leads to the three-way cock 100. The three-way cock 100 having the vent opening 129 has the ports 130, 131 and circumferential port 132. A valve plug 133 with the port 134 and operating handle 135 is fitted to the said three-way cock 100. Branch piping 140 extends from the pipe 98 and has fitted thereto a three-way cock 141 similar to 100. It has the valve plug 142 with the port 143 and regulating handle 144. An inlet port 145, outlet port 146, circumferential port 147 and vent opening 148 are formed with the three-way cock 141. A conduit 150 with a length of flexible tubing 151 connects the conduit 67 with the three-way cock 141.

A branch pipe 155 extends from the pipe 97 at one end of the car adjacent to the three-way cock 100, and a branch pipe 156 extends from the pipe 98 at the other end of the car adjacent to the three-way cock 141. A three-way cock 157 is connected to the branch pipe 155 and has the inlet port 158, outlet port 159, vent opening 160 and circumferential port 161. A valve plug 162 for the cock 157 has the port 163 and operating handle 164. A three-way cock 170 is connected to the branch pipe 156 and has formed therewith the inlet port 171, outlet port 172, circumferential port 173 and vent opening 174. A valve plug 175 with the port 176 and operating handle 177 is connected up with the three-way cock 170. Piping 180 connects the port 172 of the cock 170 with the port 159 of the three-way cock 157.

A branch pipe 181 extends from the piping 180 and connects with the brake cylinder 182. A piston rod 183 in the latter cylinder 182 has connected thereto the piston 184, and a spring 185 encircling the piston rod 183 bears between the piston 184 and the bonnet 186 of the brake cylinder 182. The said brake cylinder 182 is suitably suspended from the body 15 of the car. One end of the piston rod 183 is pinned to the connecting rod 188, and the latter is in turn pinned to the brake lever 189. The usual elements connect the lever 189 with the brake shoes 21 of the car as shown and fully described in my patent application for combined electric and air brakes, Serial Number 527,847, filed November 13, 1909. The pair of three-way cocks 100 and 141, and the pair of three-way cocks 157 and 170 are indexed so that no confusion can arise in their use. This may be accomplished by painting or lettering each pair of said cocks differently.

To each of the branch pipes 155 and 156 is connected a signal cylinder 199 as fully described in my patent application for air brakes, filed July 28, 1909, Serial Number 510,124 and for the purpose of explanation its construction is described herewith. It is shown with the cylinder heads 200 and 201. A piston 202 in the cylinder 199 has formed therewith the circumferential port 203 on the surface thereof and the longitudinal port 204 which connects therewith. A piston rod 205 passes through the cylinder head 201 and around which is located the spring 206 that bears between the head 201 and knurled nut 207 to maintain the piston in its normal position, a clamping nut 208 being also carried on the piston rod 205. In the wall of the cylinder 199 is formed a port 209, with the ends 210 and 211, that can register with the circumferential port 203. The port 209 is connected with the piping 212 having the valve 215 and leads to the whistle 213. The function of the whistle is to apprise the operator or motorman when the pressure in the reservoir 85 is above or below a predetermined range of pressure. If the pressure rises too high the piston 202 rises in the cylinder 199, the port 203 registering with the end 210 of the port 209. The air then flows through the ports 204, 203 the end 210 enters the piping 212 to blow the whistle 213. Should the pressure fall too low the port 203 registers with the end 211 of the port 209 and the air then in a similar manner blows the said whistle 213. A gage 214 is also attached to each of the branch pipes 155 and 156 to notify the operator of the pressure within the reservoir 85. In the event of the signal cylinder announcing pressures higher or lower than the limits fixed for automatic operation, and the gage does not quickly thereafter indicate a return to normal conditions, the operator can disregard or disconnect the automatic appurtenances of regulation of pressure, and utilize the hand controlling device for a restoration to normal conditions.

To lubricate the appurtenances within the casing 72, an oil cup 220 is located above platform 16 of the car, and from which leads a conduit 221, with a flexible section 222. Branch conduits 223 extend from the conduit 221 and lead to said casing to lubricate the operating elements therein To operate the invention the car is run to rotate the axle 20 of the truck 17, the members of the clutch having been engaged by means of the lever 53, the said lever being temporarily clamped in place on its segmental support 55, the valves of all the appurtenances of the invention being temporarily adjusted, so that no air can escape. The valve 96 in the preliminary charging of the reservoir 85 is kept open, it being only closed when some of the elements of the invention are to be examined and adjusted, and to keep the air pressure in said reservoir. As soon as a predetermined pressure of air is attained in the reservoir 85 it reaches the regulating cylinder 102, by means of the conduit 95, pipe 97 and valve 101, the valve 121 being also open, but the three way cocks 100, and 141 being closed to all of their ports. Before the normal working pressure is reached in the reservoir 85 the tension of the spring 110 maintains the piston 115 at the lower end of its stroke, so that the compressed air enters the longitudinal port 118, and circumferential port 116. From the latter the compressed air enters the discharge port 105 of the regulating cylinder, then passes through the valve 121 and into the conduit 67 to charge the clutch cylinder 46. Air pressure is now exerted on the piston 48 against the tension of the spring 51. The clutch member 33 is now forced into engagement with the clutch member 32, thereby securing the latter member and consequently the spur gear 30 to the shaft 22. By means of this disposition of parts the rotations of the axle 20 of the truck 17 transmits its rotations to the said shaft 22. After the required predetermined maximum pressure in the reservoir 85 has been attained, and which is regulated by means of the adjusting nuts 108, 109, and the spring 110, the piston 115 of the regulating cylinder rises to its upper position as shown in Fig. 1 and no air can enter the clutch cylinder by way of the longitudinal port 118 and the circumferential port 116. The air in the clutch cylinder 46 and conduit 67 during the raised position of the piston 115 of the regulating cylinder 102 escapes through the circumferential port 117 and longitudinal port 119 to the upper end of said regulating cylinder from whence it escapes by way of the outlet opening 103. This latter condition releases the air pressure from the piston 48 of the clutch cylinder 46 and thereon the tension of the springs 51 and 43 disengage the clutch members 32 and 33 causing the spur gear 30 to turn on and not with the clutch shaft 22. This condition remains until the tension of the spring 110 completely pulls the piston 115 to its lowermost position, when the circumferential port 116 and port 105 are again brought in register when the operations for engaging the clutch members are repeated. The rotations of the clutch shaft 22 are transmitted through the crank 70 and connecting rod 82 to the air compressor 78, which latter fills the reservoir 85 with compressed air through the piping 88. The regulating cylinder 102 with its appurtenances provides automatic means to maintain the reservoir at the required predetermined limits of pressure, engaging the clutch members when the pressure falls to the minimum and disengaging them when it rises to the maximum.

To set the brakes the operator uses the three way cock 157 or 170 and as the operation of both are the same the former only will be described. When the brakes are in their disengaged position the plug valve 162 is located to register its port 163 with the vent opening 160, so that no compressed air can pass through the said three way cock 157, from the branch pipe 155 to the piping 180 and branch pipe 181 into the brake cylinder 182 against the piston 184 therein. In this location of the plug valve 162 any pressure against said piston 184 escapes through the vent opening 160. Should it now be desired to move the piston 184 to set the brakes of the car the operator turns the handle 164 to register the port 163 of the valve plug 162 with the ports 158 and 159 of the said three way cock when the compressed air from the branch pipe 155 enters the piping 180, bears on the piston 184, overcoming the tension of the spring 185 and thereby the brakes of the car are set. To release said brakes the plug valve 162 is again turned to the position shown in Fig. 1. During the manipulations of the valve plug 162, the plug valve 175 of the three-way cock 170 is turned to its closed position so no air pressure can flow through the latter three way cock 170. During the automatic operation of the invention as above described the three way cocks 100, and 141 are closed against the conduits connected therewith.

Should for any reason the regulating cylinder 102 with its appurtenances become inoperative the valves 101 and 121 are closed to cut out and by pass said regulating cylinder, and the operations of the piston 48 of the clutch cylinder 46 are controlled with the three way cocks 100 and 141. The operations of both are the same so the description will be confined to the three way cock 100. When air pressure is to be brought from the reservoir 85 to engage the clutch members 32 and 33, the port 134 of the valve plug 133 is located by means of the handle 135 to register with the ports 130, and 131, by reason of which the compressed air from the piping 99 can enter the conduit 67 and thereby bear against the piston 48 in the clutch cylinder 46 to engage the members of the clutch. If the operator wishes to disengage said members he turns the handle 135 so that the port 134 registers with the circumferential port 132 and vent opening 129 when the compressed air escapes from the clutch cylinder by way of the conduit 67 and said three-way cock 100, and allows the tension of the springs 51 and 43 to disengage the clutch members.

It will be noted that all the operating appurtenances of the invention are within easy reach or control of the operator, and that it makes no difference in which direction the car runs, forward or back, to insure the operation of the invention.

The momentum of the vehicle or car is utilized to operate the invention, irrespective of whether the propelling motor is driving the car or not, thus securing an important feature of economy.

An important function of the regulating cylinder is the feasibility of providing a substantial interregnum between the intermittent operations of the compressor.

Having described my invention what I desire to secure by Letters Patent and claim is:

1. In a vehicle the combination of an axle, a clutch shaft adjacent to said axle, means to intermittently drive the clutch shaft from the axle, a clutch on the clutch shaft, a clutch cylinder connected up with said clutch, a compressor on the vehicle connected up with the clutch shaft, a reservoir for the vehicle, piping connecting the compressor and the reservoir, a regulating cylinder on the vehicle, discharge piping leading from the reservoir and connecting with the regulating cylinder, a pair of three-way cocks connected to the discharge piping of the reservoir, conduits connecting the three-way cocks and the clutch cylinder, piping connecting the said conduits and the regulating cylinder, the pressure in the reservoir regulated by the regulating cylinder and the latter controlling the operations of the clutch cylinder.

2. In a vehicle the combination of an axle, a gear on said axle, a clutch shaft adjacent to said axle, a clutch on the clutch shaft, a gear connected up with one of the members of said clutch and in mesh with the gear on the axle, a clutch cylinder connected up with one of the members of the clutch, a compressor on the vehicle, a connection between the compressor and the clutch shaft, a reservoir on the vehicle, piping connecting the reservoir and the compressor, an outlet conduit extending from the reservoir, pipes extending from said conduit to opposite ends of the car, a pair of three-way cocks connected to said pipes, piping connecting the three-way cocks, a brake cylinder connected to the latter piping, connections between the brake cylinder and the brakes of the vehicle, a second three-way cock on each of the pipes that extend to the end of the vehicle, a regulating cylinder connected to one of the pipes that is in connection with the reservoir, a conduit connecting one of the second three-way cocks with the clutch cylinder and piping extending between said conduit and the regulating cylinder.

3. In a vehicle the combination of an axle, a clutch shaft parallel to the axle, gearing extending from the shaft to the axle, a clutch to intermittently lock said gearing with the said shaft, a clutch cylinder to operate said clutch, a reservoir on the vehicle, means interposed between the said reservoir and clutch to charge said reservoir with compressed air, piping connecting the reservoir with the clutch cylinder, a regulating cylinder interposed in said piping, a piston in said cylinder, a circumferential port at each end of the piston and on the surface thereof, a longitudinal port through the piston extending from each circumferential port to the opposite end of the piston, a port at one end of the regulating cylinder connecting with one end of said piping, and a second port in said cylinder connecting with the other end of said piping.

4. In a vehicle the combination of an axle, a clutch shaft parallel to the axle, gearing interposed between the axle and clutch shaft, a clutch to lock the gearing supported on the clutch shaft therewith so as to intermittently rotate the clutch shaft from the rotations of the axle, a clutch cylinder for the clutch, a compressor on the truck of the vehicle, connections between the clutch shaft and the compressor, a reservoir on the vehicle, piping connecting the reservoir and the compressor, a pair of three-way cocks on the vehicle to control the operations of the clutch cylinder, piping connecting the reservoir with the three-way cocks, piping connecting one of said cocks with the clutch cylinder, a regulating cylinder interposed between said piping and the piping leading from the reservoir to said three-way cocks, a pair of branch pipes leading from the piping connected with the reservoir, a three-way cock on each of the branch pipes, piping connecting the latter three-way cocks, a brake cylinder connected to the latter piping and controlled by the cocks on the branch pipes, and connections between the brake cylinder and the brakes of the vehicle.

5. In a vehicle the combination of a clutch shaft, a spur gear journaled thereon, one of the members of a clutch connected to said gear, a second clutch member slidably supported on said shaft, a clutch cylinder coacting with said second member, a casing inclosing said clutch shaft and the appurtenances coacting therewith and means to blow air through said casing.

Signed at Jersey City in the county of Hudson and State of New Jersey this 15 day of February A. D. 1910.

EDWARD W. WOOLLEY.

Witnesses:
JAMES E. WOOLLEY,
A. A. DE BONNEVILLE.